(12) United States Patent
Jeong et al.

(10) Patent No.: US 11,459,412 B2
(45) Date of Patent: Oct. 4, 2022

(54) EPDM TERPOLYMER AND MANUFACTURING METHOD THEREFOR

(71) Applicants: Hyundai Motor Company, Seoul (KR); Kia Motors Corporation, Seoul (KR); KUMHO POLYCHEM CO., LTD., Seoul (KR)

(72) Inventors: Byeong-Heon Jeong, Seoul (KR); Hee Ryoung Koo, Daejeon (KR); Au Ji Ru Son, Daejeon (KR); Young Min Jang, Daejeon (KR); Hyun Soo Kim, Yeosu-si (KR)

(73) Assignees: Hyundai Motor Company, Seoul (KR); Kia Corporation, Seoul (KR); Kumho Polychem Co., Ltd., Seoul (KR)

( * ) Notice: Subject to any disclaimer, the term of this patent is extended or adjusted under 35 U.S.C. 154(b) by 133 days.

(21) Appl. No.: 16/896,683

(22) Filed: Jun. 9, 2020

(65) Prior Publication Data
US 2021/0179750 A1 Jun. 17, 2021

(30) Foreign Application Priority Data
Dec. 16, 2019 (KR) .................. 10-2019-0168165

(51) Int. Cl.
| | | |
|---|---|---|
| C08L 23/16 | (2006.01) | |
| C08F 210/06 | (2006.01) | |
| C08F 4/68 | (2006.01) | |
| C08F 4/14 | (2006.01) | |
| C08F 6/02 | (2006.01) | |

(Continued)

(52) U.S. Cl.
CPC .............. C08F 210/06 (2013.01); C08F 4/14 (2013.01); C08F 4/68 (2013.01); C08F 6/02 (2013.01); C08F 6/12 (2013.01); C08L 23/16 (2013.01); *C08F 2/04* (2013.01); *C08L 2314/02* (2013.01)

(58) Field of Classification Search
CPC ..................................................... C08L 23/16
See application file for complete search history.

(56) References Cited

U.S. PATENT DOCUMENTS

| | | |
|---|---|---|
| 2002/0143122 A1 | 10/2002 | Laughner et al. |
| 2009/0111944 A1 | 4/2009 | Kuhlman et al. |

(Continued)

FOREIGN PATENT DOCUMENTS

| | | |
|---|---|---|
| JP | H10513489 A | 12/1998 |
| JP | 2002526548 A | 8/2002 |
| JP | 3501408 B2 | 3/2004 |

(Continued)

*Primary Examiner* — Catherine S Branch
(74) *Attorney, Agent, or Firm* — Slater Matsil, LLP (57) ABSTRACT

A method can be used for manufacturing an ethylene-propylene-diene terpolymer for a fuel cell. A polymerization step includes subjecting an organic chelate compound forming a coordinate bond, a vanadium-based Ziegler-Natta catalyst, an organoaluminum compound, and ethylene, propylene, and diene monomers, together with a solvent, to polymerization in a reactor. A separation step includes recovering residual catalysts and unreacted monomers from the stream discharged from the reactor. An acquisition step includes recovering the solvent from the stream deprived of the residual catalysts and unreacted monomers to acquire the ethylene-propylene-diene terpolymer.

20 Claims, 5 Drawing Sheets

(51) Int. Cl.
*C08F 6/12* (2006.01)
*C08F 2/04* (2006.01)

(56) References Cited

U.S. PATENT DOCUMENTS

| | | |
|---|---|---|
| 2015/0344593 A1 | 12/2015 | Sarma et al. |
| 2020/0123291 A1* | 4/2020 | Atienza ................ C08F 210/18 |

FOREIGN PATENT DOCUMENTS

| | | |
|---|---|---|
| JP | 2004512341 A | 4/2004 |
| JP | 2007510032 A | 4/2007 |
| JP | 2008512543 A | 4/2008 |
| JP | 2018507928 A | 3/2018 |
| KR | 100619153 B1 | 8/2006 |
| KR | 100626229 B1 | 9/2006 |
| KR | 100700765 B1 | 3/2007 |
| KR | 20070117674 A | 12/2007 |
| KR | 101174806 B1 | 8/2012 |
| KR | 101216691 B1 | 12/2012 |
| KR | 101265891 B1 | 5/2013 |
| KR | 20130086216 A | 7/2013 |
| KR | 101501853 B1 | 3/2015 |
| KR | 20150103696 A | 9/2015 |
| WO | 0020426 A1 | 4/2000 |
| WO | 2005049659 A1 | 6/2005 |
| WO | 2006033513 A1 | 3/2006 |
| WO | 2016114915 A1 | 7/2016 |
| WO | 0234759 A1 | 5/2020 |

* cited by examiner

[FIG. 1]

-PRIOR ART-

[FIG. 2a]

Comparative Example

[FIG. 2b]

Example 4

Comparative Example

[FIG. 5b]

Example 4

EPDM TERPOLYMER AND MANUFACTURING METHOD THEREFOR

CROSS-REFERENCE TO RELATED APPLICATIONS

This application claims priority to Korean Patent Application No. 10-2019-0168165, filed on Dec. 16, 2019, which application is hereby incorporated herein by reference.

TECHNICAL FIELD

The present disclosure relates to an ethylene-propylene-diene terpolymer for a fuel cell and a method for manufacturing the same.

BACKGROUND

Ethylene Propylene Diene Monomer (EPDM) rubbers, which are non-polar elastomers with double bond-free backbones, have excellent chemical resistance, heat resistance, cold resistance, and electric insulation, etc., and are lower in material cost and production cost, compared to special rubbers. As such, EPDM finds applications in various automobile part materials, hoses, thermoplastic elastomers (e.g., TPV) and have recently been used as a sealing material for fuel cell stacks.

Figure 1:
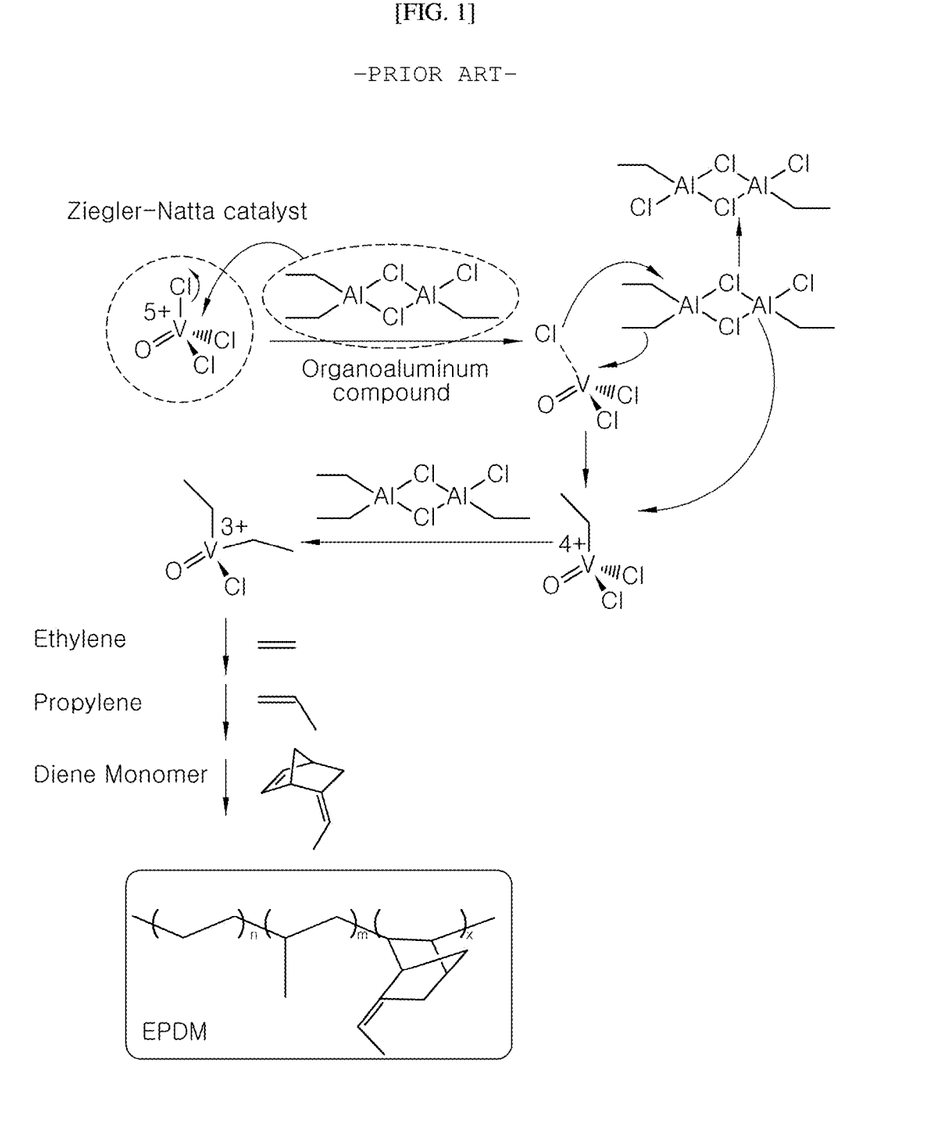
FIG. 1 is a view illustrating a general EPDM polymerization mechanism.

FIG. 1 is a reaction scheme illustrating a general EPDM polymerization mechanism. As illustrated, general EPDM can be prepared from the chemicals (ethylene, propylene, and diene monomers) by using a vanadium-based Ziegler-Natta catalyst (main catalyst) and an organoaluminum compound (promoter) or by using a metallocene catalyst with at least one metal located at the catalyst center.

For conventional general EPDM to which vanadium-based Ziegler-Natta catalysts have been applied, however, the polymer products thus obtained exhibit a wide distribution of molecular weights, which makes it difficult to secure high physical properties, because vanadium-based Ziegler-Natta catalysts are multi-site catalysts having low polymerization activity.

On the other hand, when a metallocene catalyst, which is a single-site catalyst, has been applied to EPDM, there is a limitation of developing the EPDM into products having excellent fluidity and mechanical properties for fuel cells due to the difficulty in controlling molecular weights, molecular weight distributions, and dienes therein.

The information disclosed in this Background section is only for enhancement of understanding of the general background of the invention and should not be taken as an acknowledgement or any form of suggestion that this information forms the prior art already known to a person skilled in the art.

SUMMARY

The present disclosure relates to an ethylene-propylene-diene terpolymer for a fuel cell and a method for manufacturing the same. Particular embodiments relate to an ethylene-propylene-diene terpolymer for a fuel cell, which exhibits excellent fluidity and mechanical properties by controlling molecular weights and molecular weight distributions and improving crosslinking properties and dispersity in the polymers upon polymerization and to a manufacturing method therefor.

Embodiments of the present disclosure provide an ethylene-propylene-diene terpolymer for a fuel cell, which exhibits excellent fluidity and mechanical properties as an organic chelate compound capable of forming a coordinate bond with a metal ion into a polymerization process to which a vanadium-based Ziegler-Natta catalyst is applied, whereby molecular weights and distribution of the molecular weights are controlled for the produced polymers which are thus improved in crosslinking property and dispersity and a manufacturing method therefor.

An ethylene-propylene-diene terpolymer for a fuel cell in accordance with an embodiment of the present disclosure is formed by subjecting (A) an organic chelate compound forming a coordinate bond, (B) a vanadium-based Ziegler-Natta catalyst, (C) an organoaluminum compound, and (D) ethylene, propylene, and diene monomers to polymerization.

The organic chelate compound (A) is adapted to make one ligand form a coordinate bond with a metal ion at two or more sites therein to form a complex ion or a complex.

The organic chelate compound (A) comprises at least one of acetyl ether, alkyl dioate, and alkylglycol acetate.

The molar ratio of the organic chelate compound (A) to the Ziegler-Natta catalyst (B) (A/B) ranges from 0.2 to 0.7.

The molar ratio of the organoaluminum compound (C) to the Ziegler-Natta catalyst (B) (C/B) ranges from 5.0 to 8.0.

The ethylene-propylene-diene terpolymer has a catalyst efficiency of 500 g/g-cat. or more.

The ethylene-propylene-diene terpolymer has a total solid content of 6.9 wt. % or more.

The ethylene-propylene-diene terpolymer has a Mooney viscosity (1+4, 125° C.) of 18-25.

The ethylene-propylene-diene terpolymer has a change rate in Mooney relaxation area (MRA) of −20% or more.

A method for manufacturing an ethylene-propylene-diene terpolymer for a fuel cell in accordance with an embodiment of the present disclosure comprises a polymerization step of subjecting (A) an organic chelate compound forming a coordinate bond, (B) a vanadium-based Ziegler-Natta catalyst, (C) an organoaluminum compound, and (D) ethylene, propylene, and diene monomers, together with a solvent, to polymerization in a reactor, a separation step of recovering residual catalysts and unreacted monomers from the stream discharged from the reactor, and an acquisition step of recovering the solvent from the stream deprived of the residual catalysts and unreacted monomers to acquire the terpolymer.

In the polymerization step, the organic chelate compound (A) and the Ziegler-Natta catalyst (B) are introduced at a molar ratio (A/B) of 0.2-0.7 into the reactor, and the organoaluminum compound (C) and the Ziegler-Natta catalyst (B) are introduced at a molar ratio (C/B) of 5.0-8.0 into the reactor.

According to some embodiments of the present disclosure, the following effects can be expected.

First, the molecular weight and the molecular weight distribution can be controlled to improve the fluidity and to reduce the time and energy required for product molding.

Second, roll processability and product moldability can be improved while the molecular weight distribution and diene content can be controlled to increase the mechanical properties.

Third, the compound surface is formed to be smoother and cracks at opposite ends upon processing are reduced, with the consequent improvement of productivity.

Fourth, the rubber compound decreases in Mooney viscosity and increases in processability thanks to improved dispersity and thus can be processed into a rubber sheet at a uniform thickness.

Finally, the manufacturer of rubber products can perform injection molding more precisely and easily.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

The present disclosure may be variously modified and include various exemplary embodiments in which specific exemplary embodiments will be described in detail hereinbelow. However, it shall be understood that the specific exemplary embodiments are not intended to limit the present disclosure thereto and cover all the modifications, equivalents and substitutions which belong to the idea and technical scope of the present disclosure.

An ethylene-propylene-diene terpolymer according to an embodiment of the present disclosure has a low molecular weight to improve in processability and moldability while maintaining excellent mechanical properties thanks to the narrow distribution of molecular weights. Accordingly, the ethylene-propylene-diene terpolymer can be applied to a sealing material for fuel cell stacks.

In this regard, the ethylene-propylene-diene terpolymer according to embodiments of the present disclosure is formed by subjecting (A) an organic chelate compound forming a coordinate bond with a metal ion, (B) a vanadium-based Ziegler-Natta catalyst, (C) an organoaluminum compound, and (D) ethylene, propylene, and diene monomers to polymerization.

In an embodiment, the Ziegler-Natta catalyst (B), the organoaluminum compound (C), and the ethylene, propylene, and diene monomers (D) are elements applied to the formation of conventional general EPDM.

In order to reduce the molecular weight of the terpolymer, however, an organic chelate compound (A) is further employed, in addition to the Ziegler-Natta catalyst (B), the organoaluminum compound (C), and the ethylene, propylene, and diene monomers (D), which are applied to the formation of conventional general EPDM.

In the organic chelate compound (A), one ligand forms coordinate bonds with a metal ion at two or more sites to form a complex ion or a complex.

In this regard, the organic chelate compound (A) preferably comprises at least one of acetyl ether, alkyl dioate, and alkylglycol acetate.

Particularly, the organic chelate compound (A) to the Ziegler-Natta catalyst (B) are preferably used at an A/B molar ratio of 0.2-0.7 while the organoaluminum compound (C) and the Ziegler-Natta catalyst (B) are preferably used at a C/B molar ratio of 5.0-8.0.

The limitations to kinds of the organic chelate compound (A) and to the molar ratios between organic chelate compound (A) and Ziegler-Natta catalyst (B) (A/B) and between the organoaluminum compound (C) and the Ziegler-Natta catalyst (B) (C/B) will be explained through various experiments.

Hereinafter, embodiments of the present invention will be described in detail with reference to examples. These examples are only for illustrating the embodiments of the present invention more specifically, and it will be apparent to those skilled in the art that the scope of the present invention is not limited by these examples.

1. Experiment for Physical Properties of EPDM Terpolymer According to Kinds of Organic Chelate Compound (A).

In this experiment, physical properties of EPDM terpolymer were measured according to the presence or absence and kinds of the organic chelate compound (A). The presence or absence and kinds of the organic chelate compound (A) were as indicated in Table 1, below. Measurements of the EPDM terpolymers thus obtained, including catalyst efficiency, total solid content, Mooney viscosity, ethylene content, ENB content, and Mooney relaxation area change rate are given in Table 1.

TABLE 1

| | Comparative Example | Example 1-1 | Example 1-2 | Example 1-3 |
|---|---|---|---|---|
| Organic chelate compound (A) | — | Acetyl Ether | Alkyl Dioate | Alkylglycol Acetate |
| Mole Ratio (C/B) | 7 | 7 | 7 | 7 |
| Mole Ratio (A/B) | — | 0.5 | 0.5 | 0.5 |
| Catalyst efficiency (g/g-cat.) | 490 | 514 | 511 | 503 |
| Total solid content (wt. %) | 6.7 | 7.0 | 7.0 | 6.9 |
| Mooney viscosity (1 + 4, 125° C.) | 27.5 | 20.1 | 21.3 | 24.2 |
| Ethylene content (wt. %) | 57.5 | 56.3 | 57.8 | 58.3 |
| ENB content (wt. %) | 7.9 | 8.9 | 8.4 | 8.6 |
| Mooney relaxation area change rate (%) | — | −46 | −36 | −23 |

Compared to the Comparative Example that did not employ any organic chelate compound, as can be seen in Table 1, the Examples in which organic chelate compounds were used exhibited a catalyst efficiency (polymerization activity) increase of over 500 g/g-cat while maintaining ethylene and ENB contents at equivalent levels, with the resultant increase of total solid content (TSC) to 6.9 wt. % or higher.

In addition, the terpolymers of the Examples showed a reduction in Mooney viscosity, which is an index accounting for fluidity, compared to that of the Comparative Example. As a result, the terpolymers had a Mooney relaxation area (MRA) change rate of −20% or greater, indicating a narrow distribution of molecular weights therein.

2. Experiment for Effect on Molar Ratio (A/B) of Organic Chelate Compound (A) to Vanadium-Based Ziegler-Natta Catalyst (B).

In this experiment, physical properties of the EPDM terpolymer were measured according to molar ratios (A/B) of the organic chelate compound (A) to the vanadium-based Ziegler-Natta catalyst (B). In this regard, acetyl ether was used as the organic chelate compound (A) and the molar ratio (A/B) of organic chelate compound (A) to vanadium-based Ziegler-Natta catalyst (B) was changed within the range of 0.1 to 0.9 while the molar ratio (C/B) of organoaluminum compound (C) to Ziegler-Natta catalyst (B) was fixed to be 7. Measurements of the EPDM terpolymer, including catalyst efficiency, total solid content, Mooney viscosity, ethylene content, ENB content, and Mooney relaxation area change rate are given in Table 2.

TABLE 2

| | C. Exmp. | Example No. | | | | | | |
|---|---|---|---|---|---|---|---|---|
| | | 2-1 | 2-2 | 2-3 | 2-4 | 2-5 | 2-6 | 2-7 |
| Organic chelate compound (A) | — | Acetyl Ether | Acetyl Ether | Acetyl Ether | Acetyl Ether | Acetyl Ether | Acetyl Ether | Acetyl Ether |
| Mole Ratio (C/B) | 7 | 7 | 7 | 7 | 7 | 7 | 7 | 7 |
| Mole Ratio (A/B) | — | 0.1 | 0.2 | 0.3 | 0.5 | 0.7 | 0.8 | 0.9 |
| Catalyst efficiency (g/g-cat.) | 490 | 495 | 504 | 507 | 514 | 509 | 480 | 466 |
| Total solid content (wt. %) | 6.7 | 6.8 | 6.9 | 6.9 | 7.0 | 7.0 | 6.6 | 6.4 |
| Mooney viscosity (1 + 4, 125° C.) | 27.5 | 26.4 | 24.3 | 23.1 | 20.1 | 18.3 | 17.2 | — |
| Ethylene content (wt. %) | 57.5 | 57.3 | 57.3 | 56.9 | 56.3 | 56.2 | 58.4 | — |
| ENB content (wt. %) | 7.9 | 8.6 | 8.7 | 8.9 | 8.9 | 8.8 | 8.7 | — |
| Mooney relaxation area Change rate (%) | — | −8 | −18 | −34 | −46 | −63 | −64 | — |

As is understood from data of Table 2, when the molar ratio (A/B) of organic chelate compound (A) to vanadium-based Ziegler-Natta catalyst (B) was 0.1 or less, the polymerization reaction was slightly influenced due to the low content of the organic chelate compound. As a result, there are only slight effects on the terpolymer in terms of catalyst efficiency, total solid content, Mooney viscosity, ethylene content, and Mooney relaxation area change rate, compared to that of the Comparative Example. On the other hand, when the molar ratio (A/B) of organic chelate compound (A) to vanadium-based Ziegler-Natta catalyst (B) is 0.8 or higher, a high content of the organic chelate compound interfered with the contact of the monomers with the main catalyst, incurring a reduced polymerization activity. As a result, no terpolymers satisfying required physical properties could be obtained.

In contrast, when the molar ratio (A/B) of organic chelate compound (A) to vanadium-based Ziegler-Natta catalyst (B) ranged from 0.2 to 0.7, the terpolymers showed an improvement in fluidity (reduced Mooney viscosity) and had a narrow distribution of molecular weights while maintaining ethylene and ENB contents at equivalent levels to those of the Comparative Example. Accordingly, the molar ratio (A/B) of organic chelate compound (A) to vanadium-based Ziegler-Natta catalyst (B) was found to be preferably limited to the range of 0.2-0.7 in embodiments of the present disclosure.

3. Experiment for Effect on Molar Ratio (C/B) of Organoaluminum Compound (C) to Ziegler-Natta Catalyst (B).

In this experiment, physical properties of the EPDM terpolymer were measured according to molar ratios (C/B) of organoaluminum compound (C) to Ziegler-Natta catalyst (B). In this regard, acetyl ether was used as the organic chelate compound (A) and the molar ratio (C/B) of organoaluminum compound (C) to vanadium-based Ziegler-Natta catalyst (B) was changed within the range of 2.5 to 9.0 while the molar ratio (A/B) of organic chelate compound (A) to Ziegler-Natta catalyst (B) was fixed to be 0.5. Measurements of the EPDM terpolymer, including catalyst efficiency, total solid content, Mooney viscosity, ethylene content, ENB content, and Mooney relaxation area change rate are given in Table 3.

TABLE 3

| | C. Exmp. | Example No. | | | | | | | |
|---|---|---|---|---|---|---|---|---|---|
| | | 3-1 | 3-2 | 3-3 | 3-4 | 3-5 | 3-6 | 3-7 | 3-8 |
| Organic chelate compound (A) | — | Acetyl Ether | | | | | | | |
| Mole Ratio (C/B) | 7.0 | 2.5 | 3.0 | 4.0 | 5.0 | 6.0 | 7.0 | 8.0 | ≥9.0 |
| Mole Ratio (A/B) | — | 0.5 | 0.5 | 0.5 | 0.5 | 0.5 | 0.5 | 0.5 | 0.5 |
| Catalyst efficiency (g/g-cat.) | 490 | Polymerization inactive | 374 | 458 | 514 | 514 | 514 | 520 | Difficult to control poly-merization (ethylene content 65 wt. % or more) |
| Total solid content (wt. %) | 6.7 | | 5.2 | 6.3 | 7.0 | 7.0 | 7.0 | 7.1 | |
| Mooney viscosity (1 + 4, 125° C.) | 27.5 | | 28.6 | 26.4 | 24.2 | 22.8 | 20.1 | 18.7 | |
| Ethylene content (wt. %) | 57.5 | | 63.3 | 59.4 | 57.5 | 56.5 | 56.3 | 52.1 | |

TABLE 3-continued

| | C. Exmp. | Example No. | | | | | | |
|---|---|---|---|---|---|---|---|---|
| | | 3-1 | 3-2 | 3-3 | 3-4 | 3-5 | 3-6 | 3-7 | 3-8 |
| ENB content (wt. %) | 7.9 | | 8.8 | 8.7 | 8.9 | 8.6 | 9.0 | 9.3 | |
| Mooney relaxation area Change rate (%) | — | | 20 | −2 | −24 | −39 | −46 | −59 | |

As can be seen in Table 3, the polymerization did not proceed when the molar ratio (C/B) of organoaluminum compound (C) to Ziegler-Natta catalyst (B) was 2.5 or less. At a molar ratio (C/B) of organoaluminum compound (C) to Ziegler-Natta catalyst (B) of 3.0-4.0, the polymerization proceeded, but only a slight reduction in fluidity was obtained, along with the reverse effect of a similar or wide distribution of molecular weights, compared to the Comparative Example. In addition, when the molar ratio (C/B) of organoaluminum compound (C) to Ziegler-Natta catalyst (B) was 9.0 or more, terpolymers satisfying the required physical properties could not be obtained due to difficulty in uniformly controlling polymerization, as exemplified by an increase in ethylene content.

In contrast, when the molar ratio (C/B) of organoaluminum compound (C) to Ziegler-Natta catalyst (B) was between 5.0 and 8.0, the terpolymers showed an improvement in fluidity (reduced Mooney viscosity) and had a narrow distribution of molecular weights while maintaining ethylene and ENB contents at equivalent levels to those of the Comparative Example. Accordingly, the molar ratio (C/B) of organoaluminum compound (C) to Ziegler-Natta catalyst (B) was found to be preferably limited to the range of 5.0-8.0 in embodiments of the present disclosure.

4. Experiment for Assessing Roll (Mixing) Processability.

For assessing roll (mixing) processability, compounds according to the Comparative Example and Example 4 were prepared. Compounding in the Comparative Example and Example 4 was performed as shown in Table 4, below. In this regard, the Comparative Example and Example 4 employed the same compounding elements other than EPDM terpolymers. The EPDM terpolymer according to the Comparative Example of Experiment 1 was used in the Comparative Example while the EPDM terpolymer according to Example 1-1 of experiment 1 was used in Example 4.

The compound of Table 4 was allowed to pass 18 times through a roll-mill under the conditions of a temperature of 45° C., a speed of 16/18 rpm, and a gap of 2-3 mm to afford compound rubber sheets about 6 mm thick. The sheets were assessed for roll processability and surface property and the results are depicted in FIGS. 2a and 2b.

TABLE 4

| | Content (phr) |
|---|---|
| EPDM | 100 |
| Carbon Black | 20 |
| Talc | 5 |
| DCP-40 | 4 |
| PE Wax | 1 |
| Vulkanox | 1 |
| Total | 131 |

Figure 2A:
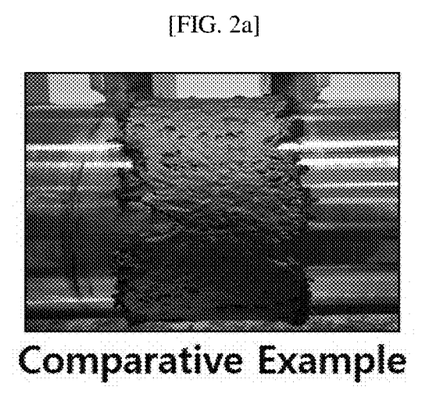
FIGS. 2a and 2b show photographic images of surfaces of the compounds of Comparative Example and Example 4 after roll processing.
Figure 2B:
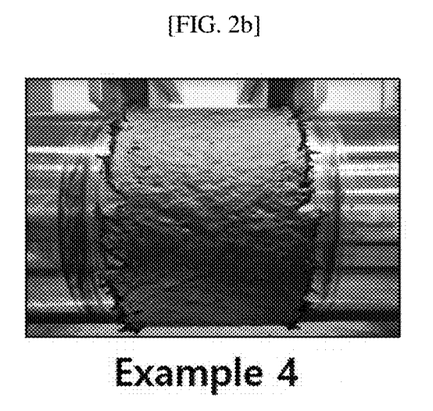

FIGS. 2a and 2b show photographic images of surfaces of the compounds of Comparative Example and Example 4 after roll processing, As shown in FIGS. 2a and 2b, the compound of Example 4 had a smoother surface formed thereon and reduced cracks at opposite ends upon processing, compared to that of the Comparative Example, with the consequent improvement of productivity. This is considered to result from a reduced Mooney viscosity in the EPDM terpolymer according to Example 4. Therefore, the EPDM terpolymer according to embodiments of the present disclosure is superior in terms of roll processability and as such, is expected to bring about an economical benefit, such as reduced production cost, to manufacturers of rubber products.

5. Experiment for Assessing Roll Sheet Property.

In order to assess roll sheet properties, thickness uniformity, surface properties, and cross-section pore properties were compared between compound rubber sheets made of the compounds of the Comparative Example and Example 4 in Experiment 4. The results are depicted in FIG. 3.

Figure 3:
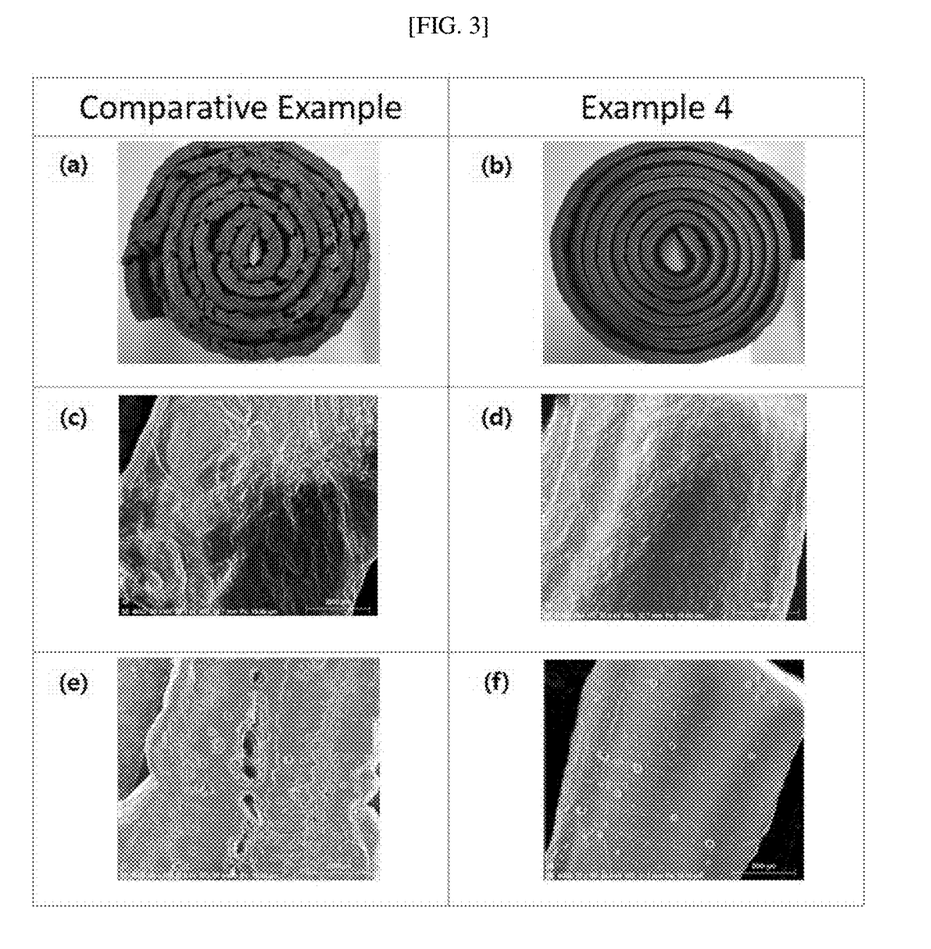
FIG. 3 shows photographic images of rubber sheets made of the compounds of Comparative Example and Example 4.

FIG. 3 shows photographic images of rubber sheets made of the compounds of the Comparative Example and Example 4.

As can be seen in FIG. 3, the rubber sheet of Example 4 (image (b)) was uniformly processed to the degree of visual identification with the naked eye, compared to that of the Comparative Example (image (a)). The EPDM terpolymer of Example 4 was compounded very well thanks to the reduced Mooney viscosity thereof, which accounts for an improvement in processability.

As for surface properties of the rubber sheets of the Comparative Example and Example 4, a rough surface was observed in the rubber sheet of the Comparative Example (image (c)) whereas a smooth surface was formed on the rubber sheet of Example 4 (image (d)), indicating that an improvement was brought about in the productivity of roll sheets.

Turning to the analysis of cross-section pore properties in the rubber sheets of the Comparative Example and Example 4, many large pores were observed in the rubber sheet of the Comparative Example (image (e)) as pores are grown to integrate with each other while relatively small pores were dispersed on the rubber sheet of Example 4 (image (f)). This pore property was attributed to the high dispersity of the compound upon roll processing thanks to the reduced Mooney viscosity of the EPDM terpolymer according to embodiments of the present disclosure, with the resultant expectation of an improvement in quality uniformity.

6. Experiment for Assessing Thickness Uniformity of Roll Sheet.

Roll sheets were assessed for thickness uniformity. To this end, the compound rubber sheets made of the compounds of the Comparative Example and Example 4 in Experiment 4 were each measured for thickness at 10 positions selected thereon at regular intervals of 50 mm in the perpendicular direction to the Roll-Mill working direction, using Mitutoyo Digimatic Caliper (manufacturer code: 500-182-30), and the measurements are depicted in FIG. 4.

Figure 4:
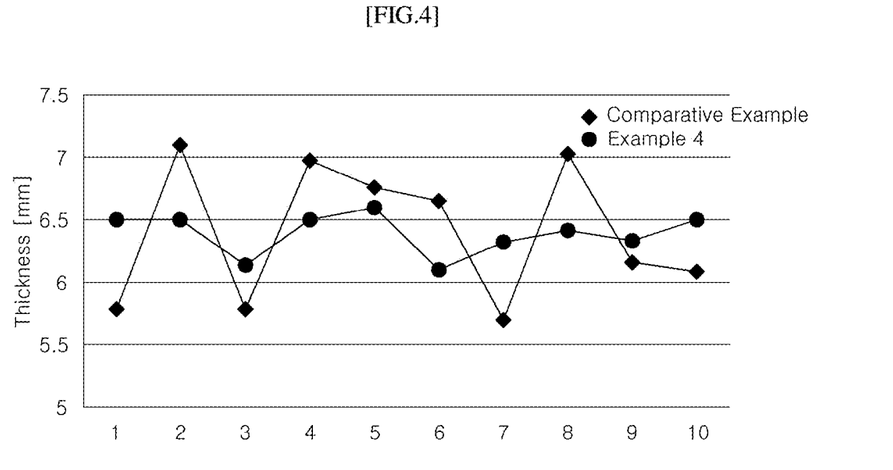
FIG. 4 is a graph showing measurements of thickness in the rubber sheets made of the compounds of Comparative Example and Example 4.

FIG. 4 is a graph showing measurements of thicknesses in the rubber sheets made of the compounds of Comparative Example and Example 4.

As can be seen in FIG. 4, average and standard deviation values of the measurements at the 10 positions were 6.43±0.52 mm for the Comparative Example, but were reduced to 6.37±0.16 mm for Example 4. The rubber sheets of Example 4 had a similar average value, but greatly reduced standard deviation, compared to those of the Comparative Example. This result implies that the rubber sheets of Example 4 can reduce the non-uniformity in thickness.

7. Experiment for Assessing Mechanical Property and Mold Filling Performance.

The compounds of the Comparative Example and Example 4 in Experiment 4 were assessed for mechanical properties and mold filling performance. In this regard, hardness, tensile strength, and elongation were measured as indicators accounting for mechanical properties while mold filling performance was measured to compare fluidity therebetween. The results are given in Table 5, below and depicted in FIGS. 5a and 5b.

Figure 5A:
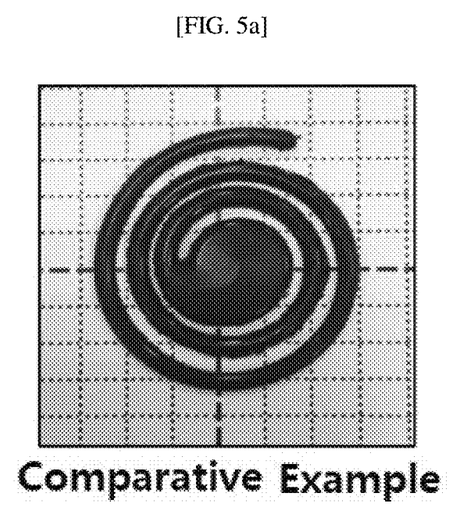
FIGS. 5a and 5b show assessing results for spiral mold filling performance of the compounds of Comparative Example and Example 4 in photographic images.
Figure 5B:
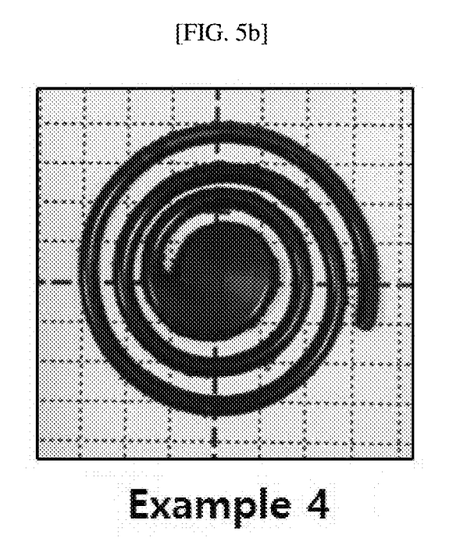

FIGS. 5a and 5b show assessing results for spiral mold filling performance of the compounds of Comparative Example and Example 4 in photographic images.

TABLE 5

|  | Mechanical Property | | | Filling Performance | |
|---|---|---|---|---|---|
|  | Hardness (Shore A) | Tensile Strength (MPa) | Elongation (%) | Weight (g) | Improvement (%) |
| Comparative Example | 57 | 10.0 | 402 | 1.4 | — |
| Example 4 | 56 | 12.0 | 476 | 1.6 | 14 |

As is understood from the data of Table 5, the tensile strength and the elongation were improved in Example 4 compared to the Comparative Example when compared at similar hardness values. These results supported a narrow distribution of molecular weights.

The filling performance accounting for fluidity was improved by 14% in Example 4, compared to the Comparative Example, so that the EPDM terpolymer compound of Example 4 exhibited higher fluidity (see FIGS. 5a and 5b), implying that the EPDM terpolymer compound of embodiments of the present disclosure can be more precisely and easily molded by injection.

In Experiments 1 to 7, the EPDM terpolymers were measured for catalyst efficiency, total solid content, Mooney viscosity, Mooney relaxation area, roll processability, roll sheet thickness, hardness, mechanical properties, and filling performance as follows:

1) Catalyst efficiency (polymerization activity): weight ratios of the catalyst fed per unit time to produced terpolymer were measured.

2) Total solid content (TSC): about 3 g taken from the produced terpolymer was dried at 125° C. for 10 min (solvent recovered) and then weighed to determine the solid content.

3) Mooney viscosity: a terpolymer sample was allowed to pass 18 times through a roll-mill in the conditions of a temperature of 45° C., a speed of 16/18 rpm, and a gap of 2-3 mm to prepare a sheet about 1.4 mm thick, followed by preheating at 125° C. for 1 min and then measuring viscosity for 4 min in a Mooney viscometer (instrument name: MV2000, manufacturer: Alpha Technology) according to ASTM D 1646.

4) Mooney relaxation area: immediately after Mooney viscosity was measured, the rotor was stopped. For 10 seconds from 1.6 seconds after rotor stop, Mooney relaxation areas were measured according to ASTM D 1646.

5) Roll (mix) processability: a terpolymer sample mixed with additives such as carbon black was allowed to pass 18 times through a roll-mill in the conditions of a temperature of 45° C., a speed of 16/18 rpm, and a gap of 2-3 mm to prepare a sheet about 6 mm thick.

6) Roll sheet thickness: a roll-processed sheet sample was prepared and measured for thickness in the perpendicular direction thereto at positions distant at regular intervals of 5 cm, using Mitutoyo Digimatic Caliper (manufacturer code: 500-182-30).

7) Hardness: Shore A hardness was measured according to ASTM D 2240.

8) Mechanical properties: tensile strength and elongation were measured at a speed of 500 mm/min according to ASTM D 412.

9) Filling performance: after a spiral mold (core diameter: 6.35 mm, conchoid width: 3.2 mm) was mounted on a press, the compound was measured for filling performance in the conditions of 125° C./6 MPa/20 min, crosslinked in the condition of 170° C./6 MPa/10 min, and then withdrawn to measure the weight.

Also, provided in accordance with an embodiment of the present invention is a method for manufacturing an ethylene-propylene-diene terpolymer for a fuel cell, the method comprising a polymerization step of subjecting (A) an organic chelate compound forming a coordinate bond, (B) a vanadium-based Ziegler-Natta catalyst, (C) an organoaluminum compound, and (D) ethylene, propylene, and diene monomers, together with a solvent, to polymerization in a reactor, a separation step of recovering residual catalysts and unreacted monomers from the stream discharged from the reactor, and an acquisition step of recovering the solvent from the stream deprived of the residual catalysts and unreacted monomers to acquire the terpolymer.

For example, a 10-L single, continuously stirring reactor was used to produce a polymer. Solution polymerization was conducted, and a supply stream was composed of ethylene, propylene, 5-ethylidene-2-norbornene (ENB) in n-hexane solvent. Before the supply stream was continuously loaded into the reactor through a heat exchanger, it was mixed with a predetermined amount of hydrogen as a molecular weight controlling agent.

The vanadium-based Ziegler-Natta catalyst (B), the organoaluminum catalyst (C), and the organic chelate compound (A) were continuously fed in predetermined amounts through respective separate lines into the reactor in which maintenance was made for a pressure at 8-12 kgf/cm$^2$, a reaction duration for about 7-20 min, and a temperature at about 30-50° C.

After the polymerization, a de-ashing process known to terminate the reaction and remove the catalyst was performed, in which the stream discharged from the reactor was mixed with about 65 vol. % water, a 0.01 wt. % emulsifier, and an antioxidant while being stirred using a mixer rotating at a high speed, and loaded into a drum to stand for about 30 min or longer therein. Thereafter, the aqueous layer was separated from the reaction product to remove the residual catalyst from the aqueous layer. In addition, the pressure was reduced to recover the non-reactive monomer from the reaction product, after which the reaction product was transferred to the following processes to recover the solvent and separate the polymer.

Finally, the EPDM terpolymer of embodiments of the present disclosure was obtained through polymer drying and recovering processes.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. An ethylene-propylene-diene terpolymer comprising an organic chelate compound formed by polymerization of the organic chelate compound forming a coordinate bond, a vanadium-based Ziegler-Natta catalyst, an organoaluminum compound, and ethylene, propylene, and diene monomers.

2. The ethylene-propylene-diene terpolymer of claim 1, wherein the organic chelate compound is adapted to make one ligand form a coordinate bond with a metal ion at two or more sites therein to form a complex ion or a complex.

3. The ethylene-propylene-diene terpolymer of claim 2, wherein the organic chelate compound comprises at least one of acetyl ether, alkyl dioate, or alkylglycol acetate.

4. The ethylene-propylene-diene terpolymer of claim 1, wherein the organic chelate compound and the vanadium-based Ziegler-Natta catalyst have a molar ratio of 0.2-0.7.

5. The ethylene-propylene-diene terpolymer of claim 1, wherein the organoaluminum compound and the vanadium-based Ziegler-Natta catalyst have a molar ratio of 5.0-8.0 of organoaluminum compound to vanadium-based Ziegler-Natta catalyst.

6. The ethylene-propylene-diene terpolymer of claim 1, wherein the ethylene-propylene-diene terpolymer has a catalyst efficiency of at least 500 g/g-cat.

7. The ethylene-propylene-diene terpolymer of claim 1, wherein the ethylene-propylene-diene terpolymer has a total solid content of at least 6.9 wt. %.

8. The ethylene-propylene-diene terpolymer of claim 1, wherein the ethylene-propylene-diene terpolymer has a Mooney viscosity (1+4, 125° C.) of 18-25.

9. An ethylene-propylene-diene terpolymer formed by polymerization of an organic chelate compound forming a coordinate bond, a vanadium-based Ziegler-Natta catalyst, an organoaluminum compound, and ethylene, propylene, and diene monomers, wherein the ethylene-propylene-diene terpolymer has a change rate in Mooney relaxation area (MRA) of at least −20%.

10. The ethylene-propylene-diene terpolymer of claim 9, wherein the organic chelate compound is adapted to make one ligand form a coordinate bond with a metal ion at two or more sites therein to form a complex ion or a complex.

11. The ethylene-propylene-diene terpolymer of claim 10, wherein the organic chelate compound comprises at least one of acetyl ether, alkyl dioate, or alkylglycol acetate.

12. The ethylene-propylene-diene terpolymer of claim 9, wherein the organic chelate compound and the vanadium-based Ziegler-Natta catalyst have a molar ratio of 0.2-0.7.

13. The ethylene-propylene-diene terpolymer of claim 9, wherein the organoaluminum compound and the vanadium-based Ziegler-Natta catalyst have a molar ratio of 5.0-8.0 of organoaluminum compound to vanadium-based Ziegler-Natta catalyst.

14. The ethylene-propylene-diene terpolymer of claim 9, wherein the ethylene-propylene-diene terpolymer has a catalyst efficiency of at least 500 g/g-cat.

15. The ethylene-propylene-diene terpolymer of claim 9, wherein the ethylene-propylene-diene terpolymer has a total solid content of at least 6.9 wt. %.

16. The ethylene-propylene-diene terpolymer of claim 9, wherein the ethylene-propylene-diene terpolymer has a Mooney viscosity (1+4, 125° C.) of 18-25.

17. An ethylene-propylene-diene terpolymer, wherein the ethylene-propylene-diene terpolymer has a change rate in Mooney relaxation area (MRA) of at least −20%.

18. The ethylene-propylene-diene terpolymer of claim 17, wherein the ethylene-propylene-diene terpolymer has a catalyst efficiency of at least 500 g/g-cat.

19. The ethylene-propylene-diene terpolymer of claim 17, wherein the ethylene-propylene-diene terpolymer has a total solid content of at least 6.9 wt. %.

20. The ethylene-propylene-diene terpolymer of claim 17, wherein the ethylene-propylene-diene terpolymer has a Mooney viscosity (1+4, 125° C.) of 18-25.

* * * * *